United States Patent [19]

Furuya et al.

[11] Patent Number: 5,561,559
[45] Date of Patent: Oct. 1, 1996

[54] DISPLAY FOR A MOTOR VEHICLE

[75] Inventors: Yoshiyuki Furuya; Hidenobu Korenaga, both of Shizuoka, Japan

[73] Assignee: Yazaki Corporation, Tokyo, Japan

[21] Appl. No.: 399,656

[22] Filed: Mar. 7, 1995

Related U.S. Application Data

[62] Division of Ser. No. 986,063, Dec. 4, 1992, abandoned.

[30] Foreign Application Priority Data

Jul. 12, 1991 [JP] Japan .................. 3-054305 U
Dec. 5, 1991 [JP] Japan .................. 3-100417 U

[51] Int. Cl.⁶ ................... G02B 27/14; G02B 5/04; G03H 1/00
[52] U.S. Cl. ................... 359/640; 359/13; 359/637; 359/837
[58] Field of Search ................... 359/629, 630, 359/631, 632, 633, 634, 635, 636, 13, 637, 640, 837, 831; 345/7, 9; 348/115

[56] References Cited

U.S. PATENT DOCUMENTS

| | | | |
|---|---|---|---|
| 3,984,157 | 10/1976 | LeVantine | 351/213 |
| 4,634,223 | 11/1987 | Ishii | 359/613 |
| 4,791,534 | 12/1988 | Lindberg | 362/80 |
| 5,153,775 | 10/1992 | Itami | 359/637 |
| 5,157,549 | 10/1992 | Suzuki et al. | 359/633 |
| 5,172,100 | 12/1992 | Iino | 340/705 |
| 5,220,453 | 6/1993 | McKinley et al. | 359/481 |
| 5,229,754 | 7/1993 | Aoki et al. | 340/705 |
| 5,296,868 | 3/1994 | Itami | 345/7 |

FOREIGN PATENT DOCUMENTS

| | | |
|---|---|---|
| 4104233 | 4/1992 | Germany . |
| 3117271 | 5/1991 | Japan . |
| 2240855 | 9/1990 | United Kingdom . |

*Primary Examiner*—Georgia Y. Epps
*Assistant Examiner*—Ricky Mack
*Attorney, Agent, or Firm*—Sughrue, Mion, Zinn, Macpeak & Seas

[57] ABSTRACT

A display device for motor vehicles in which an image on the display is reflected by a reflecting member on the windshield to allow the virtual image to be viewed by the driver. The display device includes a display having an upwardly facing display surface, a first prism having a vertical angle $\theta$ formed by two surfaces of a first prism arranged so as to face the driver with one of the two surfaces arranged so as to face the display surface of the display and a second prism having substantially the same vertical angle as the first prism and being arranged in mating relation to the first prism with the vertical angles thereof opposing each other. In one embodiment, the bottom surface of the second prism confronting the vertical angle $\theta$ is matted, whereas other surfaces than the two surfaces forming the vertical angle $\theta$ are coated in a dark color. In another embodiment, the second prism is designed so as to prevent light emitted from the display surface from reflecting off the bottom dark colored surface of the second prism into the visual field of the driver.

6 Claims, 4 Drawing Sheets

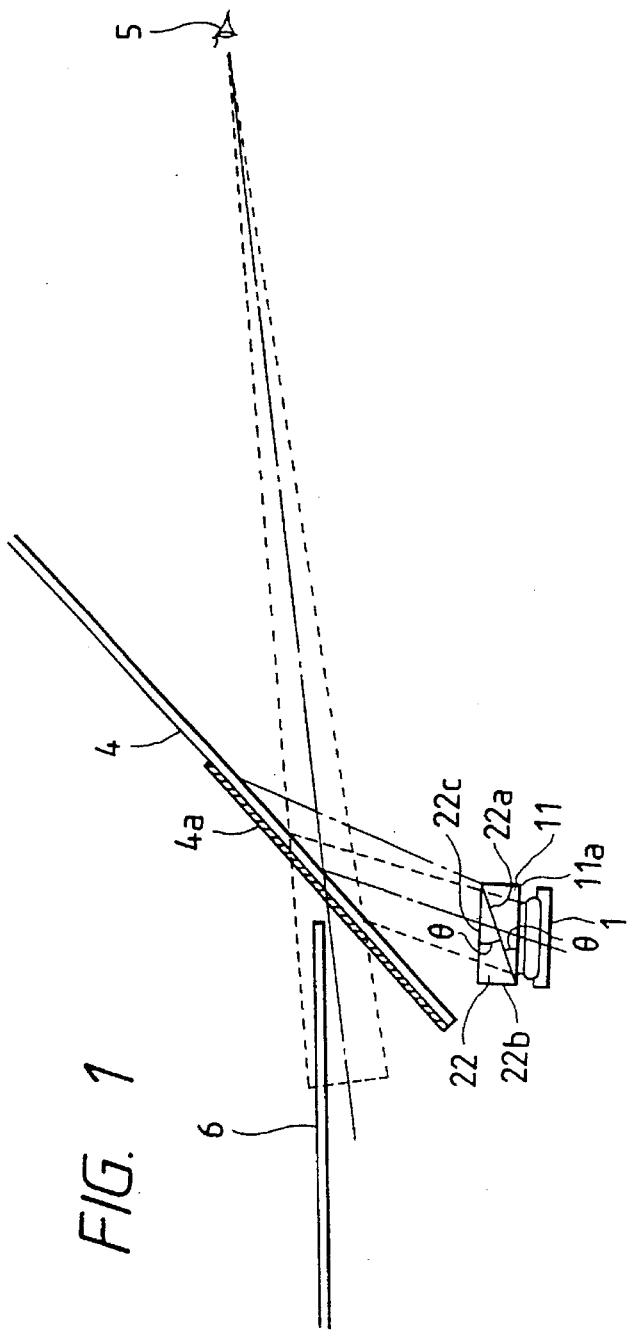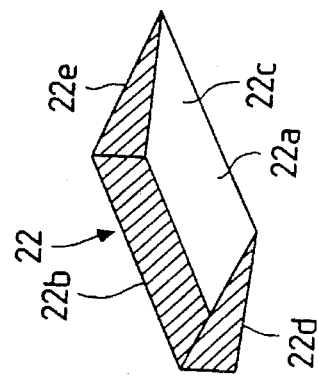

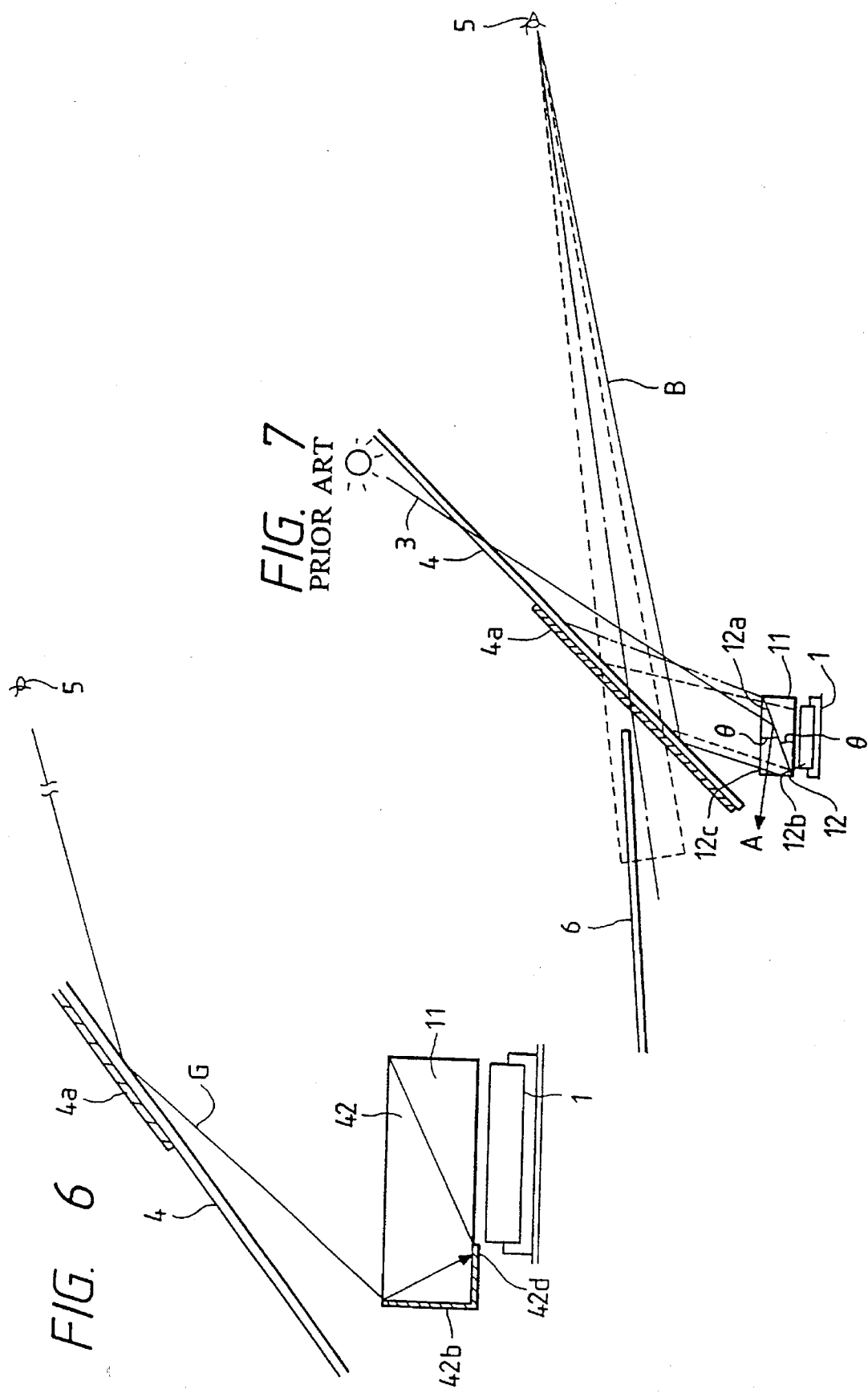

DISPLAY FOR A MOTOR VEHICLE

This is a divisional of application Ser. No. 07/986,063, filed Dec. 4, 1992, now abandoned.

BACKGROUND OF THE INVENTION

1. Field of the Invention

The invention relates to a display for motor vehicles, in which an image on the display having an upwardly facing display surface is guided toward the visual point of a driver through a reflecting member such as a windshield so that the image is visually recognized as a vertual image behind the reflecting member.

2. Background

A conventional display for motor vehicles is designed to allow a driver to identify a virtual image of a display image in front of a motor vehicle. That is, in order to remotely display an image as a virtual image in front of the motor vehicle, the display is arranged within a dashboard with the display surface thereof facing upwardly, and light emitted from the image on the display is reflected by the windshield through an opening arranged in the dashboard so that the light is guided toward the visual point of the driver.

However, since the display surface faces upwardly external light, such as sunlight, transmitted through the windshield tends to be transmitted onto the display surface which induces a "washout" phenomenon, making the display extremely hard to see. Referring to FIG. 7, to overcome this problem, a first prism 11 and a second prism 12 having the same vertical angles θ are arranged immediately above the display surface of a display 1 in such a manner that the vertical angles θ thereof oppose each other. The surfaces other than the two surfaces forming the vertical angle θ of each of the first and second prisms 11, 12 are coated with a dark color. Reference numeral 6 designates a bonnet for covering a combustion chamber.

In this case, as external light 3 enters the display 1 through windshield 4, the external light 3 is reflected by a surface 12a, at which the second prism 12 is placed over the first prism 11, in the direction of arrow A. As a result, the external light 3 is prevented from being transmitted onto the display surface of the display 1, thus leaving the display image free from washout. Further, external light is prevented from being transmitted through the sides of the first and second prisms 11, 12 due to the dark coating on these surfaces, thus further preventing the light from reaching the display 1.

Since the prisms 11, 12 having the same shape are overlapped one upon the other so that their vertical angles oppose each other, light exiting from the display 1 is little affected when transmitted through the prisms 11, 12. Thus, the display image is not distorted when seen from a visual point 5. This allows the display image to be visually identified as a virtual image at the back of a reflecting section 4a of the windshield 4 (in front of the motor vehicle).

Accordingly, if the prisms 11, 12 are placed immediately above the display surface of the display 1 as described above, reflection of the external light 3 can be regulated. However, an optical axis B extending toward the visual point 5 such as shown in FIG. 7 is established. That is, light emanating from the display is reflected by surface 12b of the second prism 12, transmitted through surface 12c, and reflected by the windshield 4 surface along the optical axis B. In this case, the angle of incidence of light transmitted onto the surface 12b from the display 1 is so wide that the reflectance of the light becomes large, which causes a highly luminous ghost-like image.

This state will be described in detail with reference to FIG. 8. The optical axis B is defined by a ray of light D and a ray of light E among a plurality of rays of light transmitted from the display 1. That is, the ray of light D and the ray of light E transmitted from a display range C establishes the optical axis B due to conditions including the inclination of the windshield 4, the distance between the display 1 and the prisms 11, 12, etc. The display range C is disposed toward the front of the motor vehicle on the display surface of the display 1. Therefore, when viewed from the visual point 5, undesired ghost-like images are seen below the desired display image, as shown in FIG. 9.

SUMMARY OF THE INVENTION

The object of the invention is to provide a display for motor vehicles capable of regulating external light that is to reach the display and providing high-quality display images free from ghost-like images.

To achieve the above object, a first aspect of the invention is applied to a display for motor vehicles, which includes a display, a first prism, a second prism, and a reflecting member. The display is arranged so that a display surface thereof faces upwardly. The first prism has a vertical angle formed by two surfaces and directed toward a driver. One of the two surfaces is disposed so as to confront the display surface of the display in close proximity thereto. The second prism has substantially the same vertical angle as the first prism and is disposed on the first prism with the vertical angle thereof opposing the vertical angle of the first prism. The reflecting member guides light that is transmitted through the first and second prisms from the display surface of the display toward a visual point of the driver. In such a display for motor vehicles, a bottom surface of the second prism confronting the vertical angle thereof is first matted and then coated with a dark color.

A second aspect of the invention is directed to a display for motor vehicles having the same components as above, in which the bottom surface of the second prism confronting the vertical angle thereof is made of a dark-colored material, the material being the same as the material of which the second prism is made.

A third aspect of the invention is directed to a display for motor vehicles having the same components as above, in which the bottom surface of the second prism confronting the vertical angle thereof is formed in a predetermined shape, so that optical axes of light emitted from the display surface and reflected by the bottom surface of the second prism through the reflecting member can be regulated.

As a result of the above construction, a ray of light out of a plurality of rays of light emitted from the display surface is transmitted through the first prism, radiated onto the second prism, and radiated onto the bottom surface of the second prism confronting the vertical angle. However, the ray of light does not reach the visual point of the driver since it is absorbed by the bottom surface. Therefore, no ghost-like images will be seen.

Further, with respect to the bottom surface of the second prism confronting the vertical angle and being formed into a predetermined shape, a ray of light out of a plurality of rays of light emitted from the display surface of the display is transmitted through the first prism, radiated onto the second prism, and radiated onto the bottom surface of the second prism confronting the vertical angle. Since the ray of light does not reach the visual point of the driver due to the regulation of its direction, no ghost-like images will appear.

BRIEF DESCRIPTION OF THE DRAWINGS

FIG. 1 is a side view of a display for motor vehicles, which is a first embodiment of the invention;

FIGS. 2(a) and 2(b) are perspective and partial side views of the second prism, respectively;

FIG. 6 is a diagram illustrative of a state in which no ghost-like images are produced using a second prism having the modified shape as in FIG. 5;

FIG. 7 is a side view of a conventional display for motor vehicles;

DETAILED DESCRIPTION OF THE PREFERRED EMBODIMENTS

Figure 3:
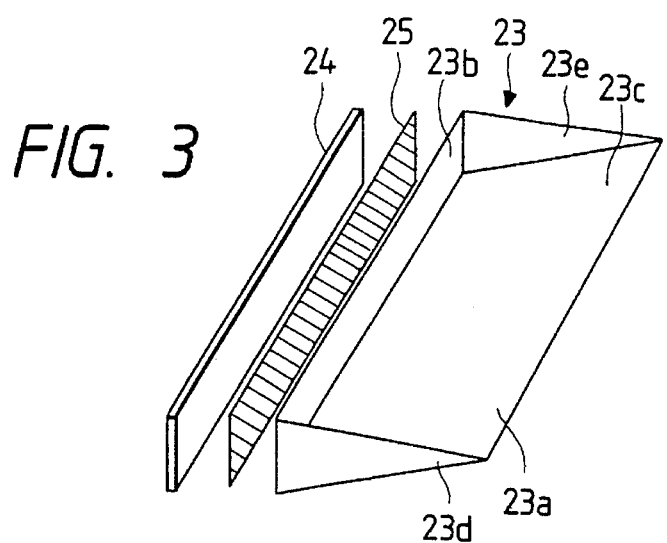
FIG. 3 is an exploded perspective view of a second prism used in a second embodiment of the invention.

Embodiments of the invention will be described with reference to the accompanying drawings. The difference between the display for motor vehicles of the invention and the conventional display described in the related art section lies in the design of the second prism that is disposed on the display surface of the display. In the following description, the same parts and components are designated by the same reference numerals.

FIG. 1 shows a display for motor vehicles, which is an embodiment of the invention, and FIG. 2(a) is a perspective view of the second prism 22 used in the display for motor vehicles of the invention. As shown in FIG. 2(a), triangular surfaces 22d and 22e including a vertical angle θ of the second prism 22 are coated with a dark color such as black while the bottom surface 22b is first matted 22b' by a matting process, such as a delustering/lusterlessing process, and then coated with the dark color, as shown in FIG. 2(b).

Therefore, rays of light radiated within the prism to the surface 22b are absorbed thus resulting in a minimal amount of reflected light even if the angle of incidence is large. Specifically, referring to FIG. 1, rays of light emitted from the display 1, first pass through the first prism 11 and are then absorbed by the bottom surface 22b of the second prism 22. As a result, the light rays do not reach a visual point 5 of a driver, hence providing display images which are free from ghost-like images.

A second embodiment of the invention will now be described. As shown in FIG. 3, a second prism 23 that is used in the second embodiment is made of an acrylic resin and is coated with a dark color, such as black, on triangular surfaces 23d, 23e including the vertical angle θ defined by first and second surfaces 23a and 23c. Further, a black acrylic plate 24 is bonded to a bottom surface 23b that opposes the vertical angle θ with a photobond 25, the acrylic plate being made of the same material and having the same dimensions as the prism 23. The second prism 23 is arranged upside down on the first prism 11 so that the vertical angles θ opposes each other, and the stacked prisms are then arranged on the display 1, as shown in FIG. 1.

Figure 4:
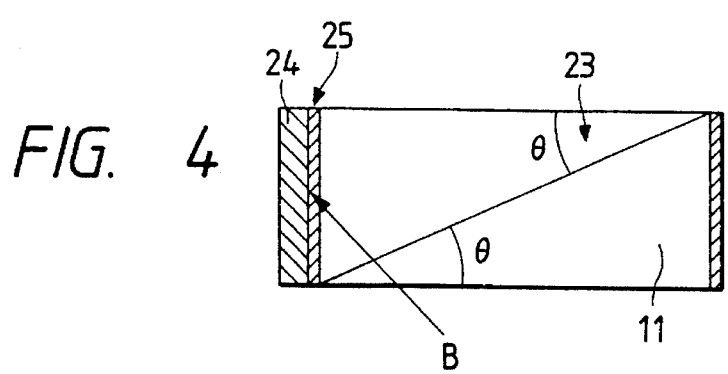
FIG. 4 is a side view of the second prism of FIG. 3 and a first prism arranged so that the vertical angles thereof oppose each other.

Since the reflectances of the second prism 23, the photobond 25, and the black acrylic plate 24 are the same, rays of light passing through an optical axis B from the display 1 as illustrated in FIG. 4, which have heretofore caused ghost-like images, are absorbed without being reflected on their boundary surfaces, thus eliminating the optical axis which has been the source of the ghost-like images. As a result, a driver can see a display image which is free of ghost-like images. In this case, any cracks present on the ends of the bottom surface 23b of the prism 23 can be filled by the photobond 25, which is an advantage because stringent accuracy in polishing the prism 23 is not required.

While the black acrylic plate is bonded to the acrylic prism using the photobond in this embodiment, the prism may be subjected to integral molding so that the bottom portion thereof is black. Since the reflectance of the transparent portion is the same as that of the black portion, no reflection will occur. In addition, fabrication by integral molding is economically advantageous compared with that involving the bonding of the black acrylic plate 24.

Figure 5:
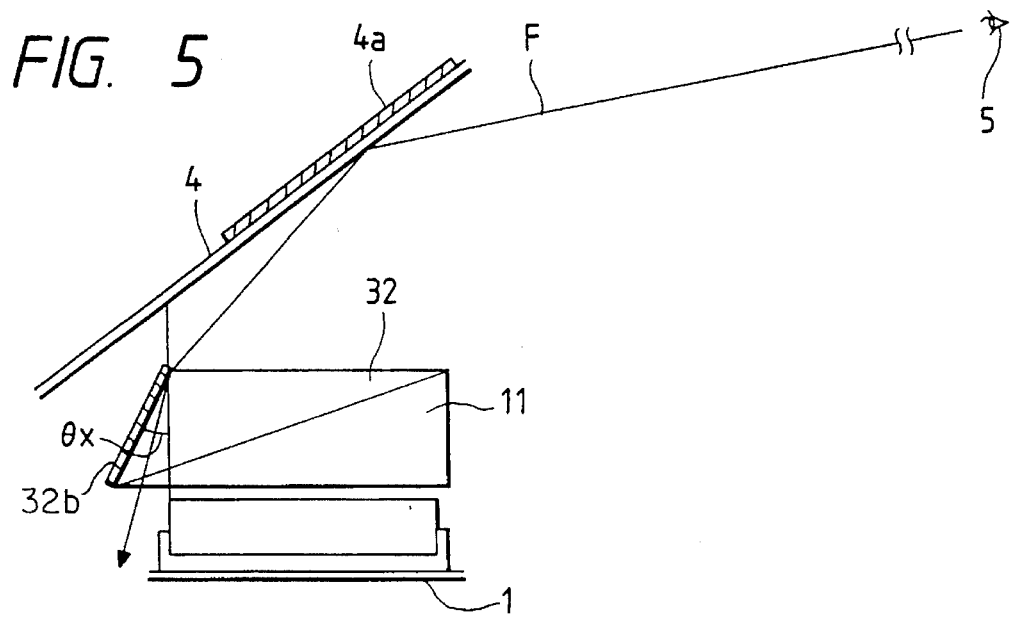
FIG. 5 is a diagram illustrative of a state in which no ghost-like images are produced using a second prism having a modified bottom surface.
Figure 8:
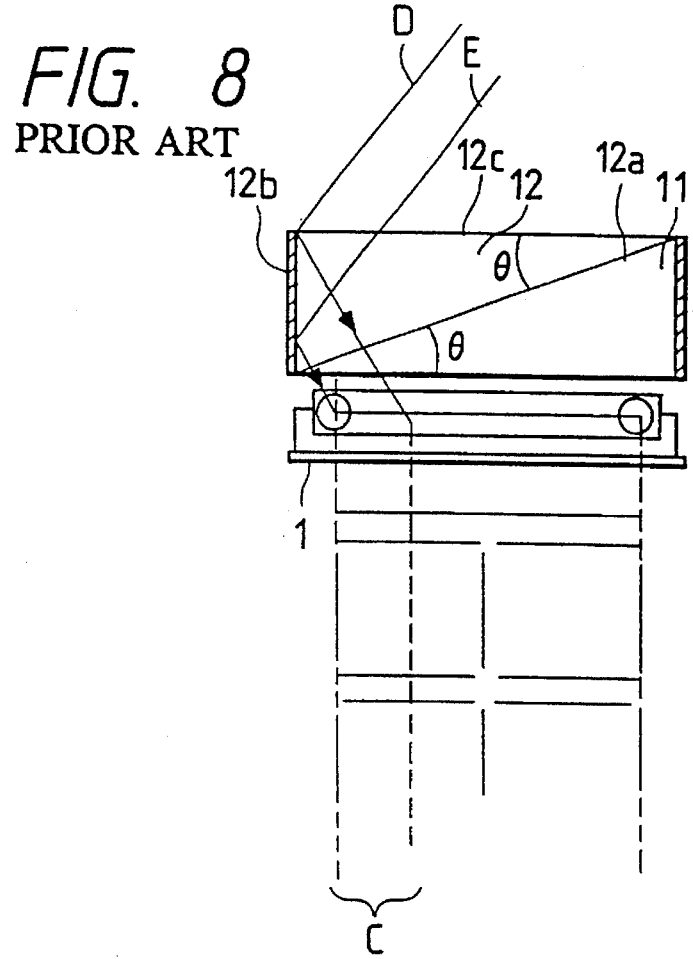
FIG. 8 is a diagram showing in detail how ghost-like images are caused in the conventional display for motor vehicles.
Figure 9:
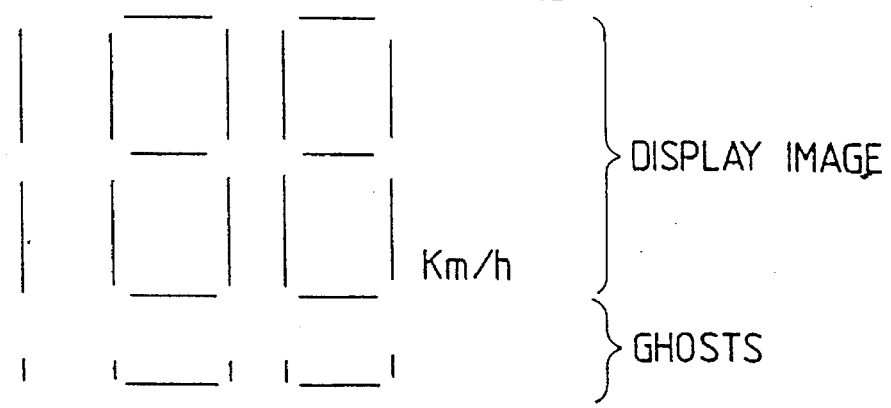
FIG. 9 is a diagram showing a convention display image with ghost-like images.

FIG. 5 shows a portion of a display for motor vehicles, which is a third embodiment of the invention. The third embodiment employs a new type of second prism 32 in which the shape of the bottom surface 12b of the conventional second prism 12 is modified. In particular, the bottom surface 32b of the second prism 32 is not disposed vertically relative to the display 1, but rather the upper surface thereof is inclined toward a driver and coated with a dark color. The importance of this arrangement can best be understood by considering a reversely directed optical axis F along which light emanating from the visual point 5 is first reflected by the surface of the windshield 4 and then radiated onto the bottom surface 32b of the second prism 32. If an angle of inclination $θ_x$ (FIG. 5) of the bottom surface 32b is determined so that the light passing along the optical path F cannot be radiated onto the display 1, no ghost-like images will be present when viewed from the visual point 5. That is, light emitted from the display and reflected off the bottom surface 32b will not be radiated on visual point 5 and will thus not be visible to a driver of the vehicle.

FIG. 6 shows a portion of a display for motor vehicles, which is a fourth embodiment of the invention. The fourth embodiment employs a new type of second prism 42 in which the shape of the bottom surface 12b of the conventional second prism 12 is modified. Specifically, the second prism 42 is formed by bonding a square prism to the bottom surface 12b of the conventional second prism 12, so that the sectional view thereof is trapezoidal. The left bottom surface 42b of the second prism 42 and a lower portion 42d not confronting the display 1 are coated with a dark color. Again, the importance of this arrangement can best be understood by considering a reversely directed optical axis G along which light from the visual point 5 is reflected by the surface of the windshield 4 and radiated onto the left side 42b of the second prism 42. If the width of the portion 42d not confronting the display 1 is determined so that the light passing along the optical axis G cannot be reflected onto the display 1, no ghost-like images will be present when viewed from the visual point 5. That is, light emitted from the display and reflected off the left side of the prism will not be radiated on visual point 5 and will thus not be visible to a driver of the vehicle.

As described above, the invention is characterized by the special profiles associated with the prisms that are arranged so as to confront the display in proximity thereto. As a result of the arrangement, not only external light reaching the display can be regulated, but unnecessary optical axes reaching the visual point of a driver from the display can also be regulated, thereby providing high-quality display images.

What is claimed is:

1. A display apparatus for motor vehicles, comprising:

a display including an upwardly facing display surface;

a first prism having a vertical angle defined by first and second surfaces and oriented toward a driver of said vehicle, said first surface being disposed so as to confront the display surface of the display in proximity thereto;

a second prism having substantially the same vertical angle as the first prism defined by first and second surfaces of said second prism, said second prism being disposed such that said first surface thereof mates with said second surface of said first prism with the vertical angle of said second prism opposing the vertical angle of the first prism; and a reflecting member for reflecting light, emitted from said display surface and passing through said first and second prisms, toward a visual point of the driver, wherein a third surface of said second prism is oriented to prevent light, emitted from the display surface of the display and reflected by the third surface of the second prism through the reflecting member, from passing through said visual point.

2. The display of claim 1, wherein an angle defined by said second surface of said second prism and said third surface of said second prism is an obtuse angle.

3. The display of claim 2, wherein said upwardly facing display surface is disposed directly below only portions of said first and second surfaces of said second prism and not below said third surface.

4. The display of claim 1, wherein said second prism has a trapezoidal cross section including a triangular portion and a rectangular portion, said third surface being defined by said rectangular portion and including two surfaces disposed perpendicular to each other, said two surfaces being dark in color.

5. The display of claim 4, wherein said display surface is disposed directly below only said triangular portion.

6. The display apparatus of claim 4, wherein one of said two surfaces of said rectangular portion is coplanar with said first surface of said first prism.

* * * * *